3 Sheets—Sheet 1.
F. E. SICKELS.
Steam Engine.
No. 908. Reissued Feb. 21, 1860.
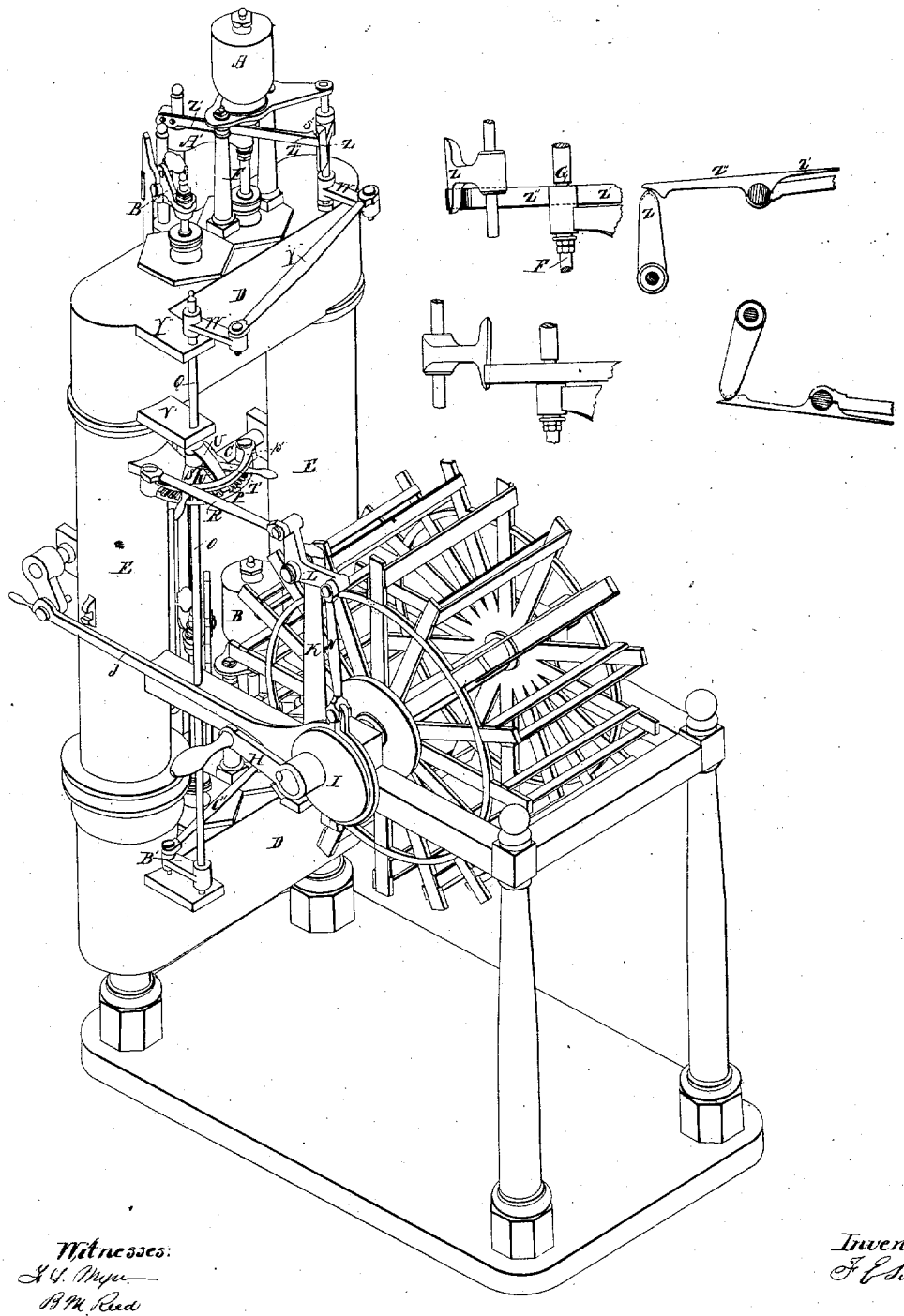
Witnesses:
J. G. Myers
B. M. Reed
Inventor:
F. E. Sickels
N. PETERS, Photo-Lithographer, Washington, D. C.

3 Sheets—Sheet 2.
F. E. SICKELS.
Steam Engine.
No. 908. Reissued Feb. 21, 1860.
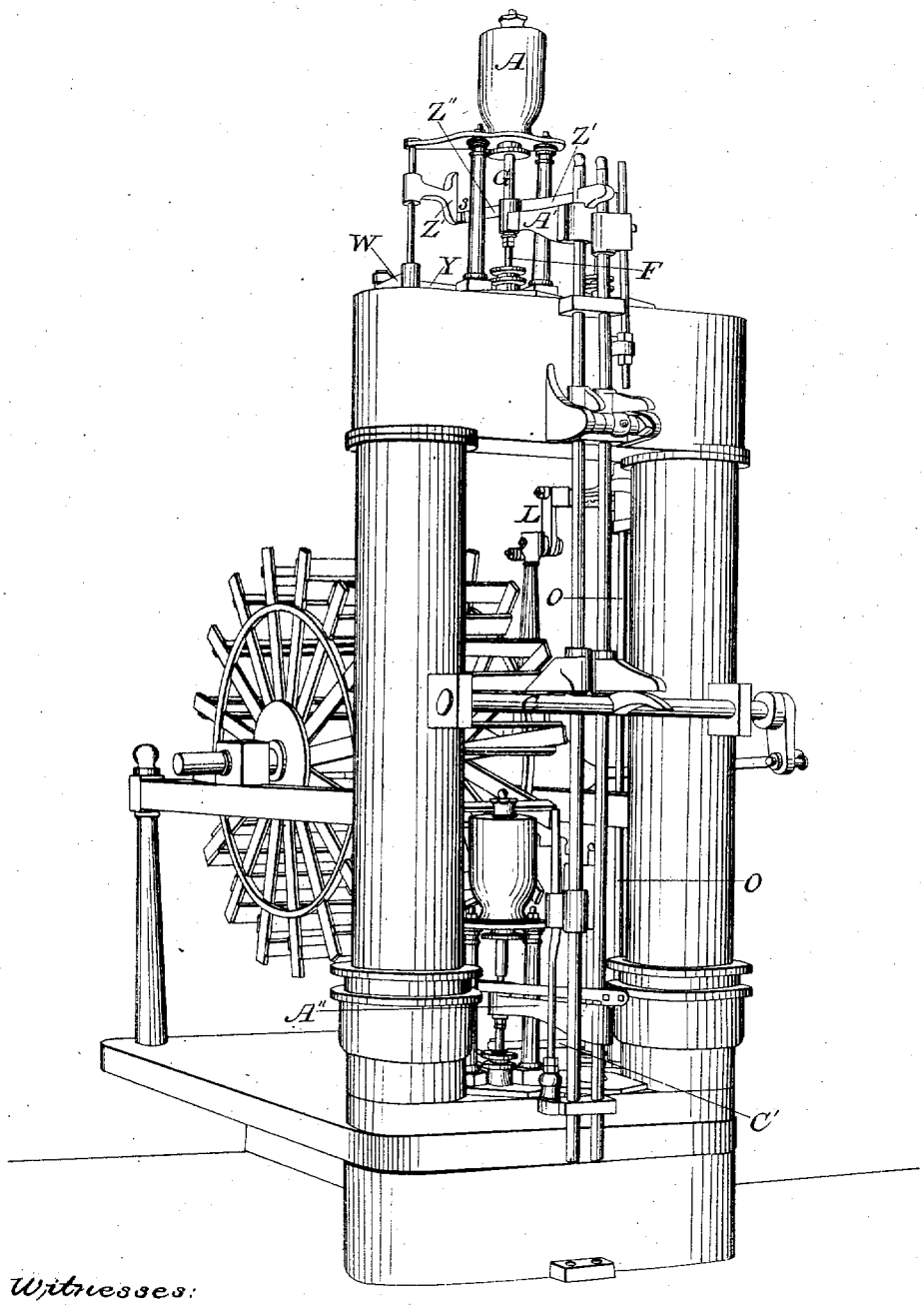
Witnesses:
Geo. S. Myer
B. McKee
Inventor:
F. E. Sickels
N. PETERS, Photo-Lithographer, Washington, D. C.

3 Sheets—Sheet 3.
F. E. SICKELS.
Steam Engine.
No. 908.
Reissued Feb. 21, 1860.
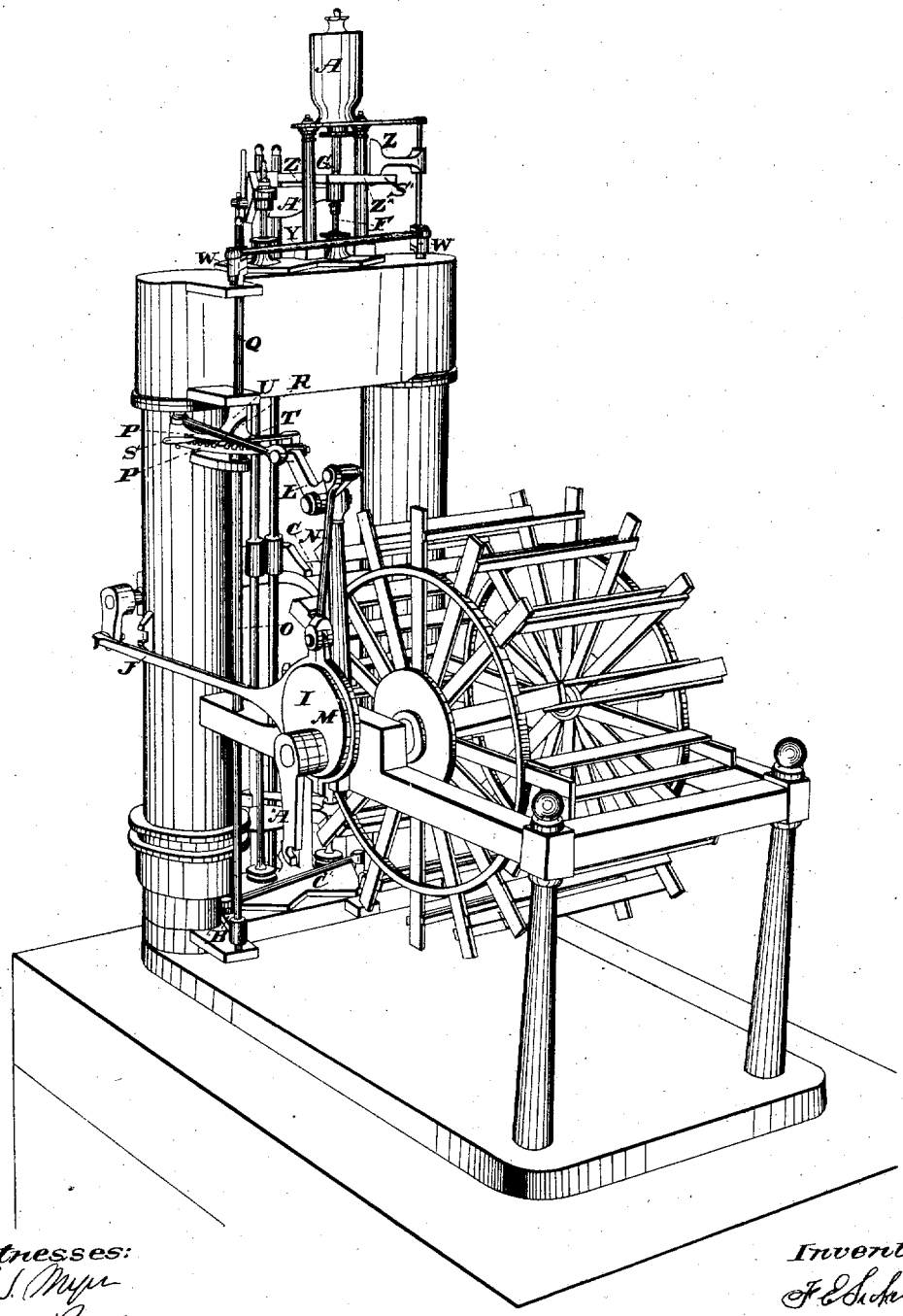
Witnesses:
H. S. Myer
B. W. Reed
Inventor:
F. E. Sickels
N. PETERS, Photo-Lithographer, Washington, D.C.

UNITED STATES PATENT OFFICE.

FREDERICK E. SICKELS, OF NEW YORK, N. Y.

IMPROVEMENT IN STEAM-ENGINES.

Specification forming part of Letters Patent No. 4,202, dated September 19, 1845; extended 7 years; Reissue No. 908, dated February 21, 1860.

DIVISION No. 2.

*To all whom it may concern:*

Be it known that I, FREDERICK ELSWORTH SICKELS, of the city, county, and State of New York, have invented a new and useful Improvement in Steam Engines; and I do hereby declare that the following is a full, clear, and exact description of the character thereof, which distinguishes it from all other things before known, and of the manner of making and using the same, reference being had to the accompanying drawings, which make a part of this specification.

The nature of my invention consists in the combination of a cam, arm, or wiper moved by an independent motion—that is, a motion not controlled by a lifter-motion that approaches a state of rest as the piston approaches the middle of the cylinder, and is therefore able to disconnect the catch with greater accuracy and certainty than if a lifter-motion alone was used—with a reciprocating trip and catch to liberate a spring, weight, or other force to close a cut-off valve, it being readily adapted to various forms of valve gearing and valves.

In operating the trip and catch with the lifter-motion alone as it approaches a state of rest, the small amount of motion at this time will not determine the disengagement with accuracy, as an increase of friction while in operation will delay or prevent the disengagement, by increasing the spring in the parts conveying or resisting the tripping-force; but if an independent motion is used, either in connection with a lifter-motion, or otherwise, an increase in friction would not so materially impair the accuracy of the disengagement.

In the accompanying drawings, Sheets Nos. 1, 2, and 3, their views are shown of the improvement in connection with others patented to me the same day as this, and they will be described in part to facilitate the explanation of the improvement herein patented, notwithstanding it may be used without them.

The same letters refer to the same parts in each figure.

F is a valve-rod or stem having a piston or plunger attached to its upper end, operating within a reservoir, A, shaped smaller at the bottom, which may confine the fluid contained therein as the plunger descends, substantially in the same manner as described in the patent granted to me the 20th of May, 1842, so as to regulate the velocity of a falling weight connected to the stem, that is sufficient to overcome all friction, inclosing the valve. To this valve or stem the rod must be attached. Any form of valve may be used, either single, double, or slide valve. A spring, Z′, has a catch-piece, Z″, connected to it, that fits into a notch formed by the catch G, and extends beyond, which piece Z″ has a curved projection, S′, at the extreme end, against which the outer face of this arm or wiper Z strikes as it vibrates on its vertical axis. The outer face of this arm or wiper is parallel with its shaft or axle, and is of greater length than the motion of the lifter, so that it can act upon the curved projections on the catch-piece Z″ as it is carried up and down by the lifter, so as to determine the time when the weight shall close the valve. The vibratory motion of the arm or wiper Z is obtained in the following manner: On its axle there is an arm, W′, connected by a rod, Y, with a similar arm, W′, on the upper end of a vertical shaft, Q, which has a spring-arm, T, at its lower end, (the outer end handle form,) with its under face provided with a fillet or catch to fall into the teeth on the upper face of sector P that vibrates on the axis of the shaft Q, and is held by means of arms U U that project from two collars that turn one on the lower end of the shaft Q and the other on the upper end of a corresponding shaft, O, below it. From one end of this sector a connecting-rod, R, extends to one arm of a bell-crank, L, the other arm of which is connected by a connecting-rod, N, with the strap M of the eccentric I, and at right angles to the eccentric rod J that operates the rock-shaft C of the lifters A′ A″, so that the sector P and the parts deriving motion from it are moving while the lifters are approaching a state of rest, and therefore the disconnection of the catch-piece from the catch to liberate the weight or spring that closes the valve will be more rapid and can be regulated with more accuracy at this period of the stroke of the piston than if the lifter-motion alone was used.

The shaft O, which is below, has a spring-arm, S, similar and corresponding to the one, T, before described, and at its lower end an arm, B′, and connecting-rod C′, corresponding with the arm W and the rod Y above, and all other corresponding parts to work the cut-off valve for the other end of the cylinder are substantially the same as the parts above described. The sector P has a plate, P′, above and parallel with it, for the purpose of strength and to act as a guard for the spring-arms S T. The face of the sector P is provided with two sets of teeth, each extending from the middle or arms U U to the ends, and the length of each part of sector is such that the motion of the spring-arms S T from one extremity of the sector to the other shall shift the position of the arm or wiper Z and the corresponding one below, so that when the spring-arms are at the outer end of the segment the arms or wipers shall vibrate without permitting the weight to move the valve to cut off, and by moving them toward the middle the extent of the cut-off shall be reduced from the maximum to the minimum—that is to say, to cut off from the greatest to the least portion of the stroke; and it will be evident that the reciprocating trip and catch can be placed to disconnect one part of the reciprocating valve motion from the other part at any convenient point on the mechanism between the source of this motion as derived from the engine and the valve, it being desirable, however, to place it as near the valve as practicable, so that there will be as little friction as possible in the liberated parts to encounter in rapidly closing the valve.

C is a rock-shaft having a reciprocating movement imparted to it by the eccentric, and communicating this to the rods, lifters, and valves. The catch-piece Z is moved from the acting-surface of G in disconnecting and back again in connecting, they thus forming a reciprocating trip and catch in connecting and disconnecting the valve-gear. A weight or other force sufficient to close the valve, and a stop to hold the catch within the range of the engaging mechanism, should be used—either in connection with a fluid-reservoir or otherwise—and if not furnished by or with the valve should be connected therewith. Other forms of valve-gear and also other forms of reciprocating trip and catch may be substituted for those here shown without altering the character of this invention.

It will be evident from the foregoing that any motion derived from any part of the engine may be substituted for the motion of the arms or wipers, provided it has motion as distinguished from the lifter-motion—as, for instance, instead of the horizontal vibratory motion of the arms or wipers, the time when the catch-piece may be disconnected from the catch may be regulated by a vertical descending motion as the lifter rises, and in this case it will be by the co operation of this independent motion with another motion that the catch G and catch-piece Z″ are disconnected.

Other forms of adjustable mechanism than that here described may be used for the independent motion, or all may be dispensed with in the use of this invention.

Sheet No. 4 shows plan and elevation of parts before described—it being understood that the form and arrangement of them will depend in each case, as in this, upon the general arrangement of the valve-gear—and to which attention is particularly required in order to understand this invention.

F is a valve-rod or stem to which the weight and valve are connected.

Z is a wiper moved by an independent motion.

Z′ is a spring.

G is a catch.

Z″ is the catch-piece, having a reciprocating movement in moving to and from the catch G in connecting and disconnecting.

What I claim as new, and desire to secure by Letters Patent, is—

The combination of a cam, arm, or wiper moved by an independent motion with a reciprocating trip and catch to liberate a weight, spring, or other force that acts to close a cut-off valve.

FREDERICK E. SICKELS.

Witnesses:
C. W. GEDDES,
F. S. MYER.